United States Patent [19]

Tomesko

[11] Patent Number: 4,502,909
[45] Date of Patent: Mar. 5, 1985

[54] METHOD AND APPARATUS FOR ADHERING A WORKPIECE TO A SUPPORT BLOCK

[75] Inventor: Charles L. Tomesko, St. Petersburg, Fla.

[73] Assignee: Automated Optics, Inc., Clearwater, Fla.

[21] Appl. No.: 86,130

[22] Filed: Oct. 18, 1979

[51] Int. Cl.³ .......................... B31F 5/00; B65C 11/04
[52] U.S. Cl. .................................. 156/356; 156/423; 156/497; 156/539; 156/556; 156/578
[58] Field of Search ................ 156/69, 356, 357, 362, 156/423, 424, 497, 498, 556, 538, 539, 578; 269/21, 254 R, 287; 118/243, 321, 241

[56] References Cited

U.S. PATENT DOCUMENTS

| | | | |
|---|---|---|---|
| 1,142,956 | 6/1915 | Greenberg et al. | 269/254 R |
| 2,349,455 | 5/1944 | Olson | 118/243 |
| 2,976,200 | 3/1961 | Stover | 156/69 |
| 2,980,432 | 4/1961 | Benson | 269/287 |
| 3,244,574 | 4/1966 | Decker et al. | 156/423 |
| 3,417,454 | 12/1968 | Beasley | 156/556 |
| 3,630,807 | 12/1971 | Fujimura | 156/357 |
| 3,813,998 | 6/1974 | Lotto | 156/498 |
| 3,833,230 | 9/1974 | Noll | 269/21 |
| 3,855,034 | 12/1974 | Miller | 156/556 |
| 3,873,400 | 3/1975 | Tsuchida et al. | 156/556 |
| 3,985,270 | 10/1976 | Larkin | 118/243 |

Primary Examiner—Jerome Massie
Attorney, Agent, or Firm—Burns, Doane Swecker & Mathis

[57] ABSTRACT

A machine for aligning and mounting a lens precursor on a support block includes apparatus for depositing a predetermined amount of adhesive on one of the precursor and the support block and then translating the other along an alignment axis to bring them into engagement with one another in precise alignment. Optionally, the precursor and support block can be rotated relative to one another while they are brought into engagement to spread the adhesive evenly on their interfacing surfaces. A novel pitch block onto which a lens precursor can be mounted and a device for removing a precursor from a pitch block are also disclosed.

2 Claims, 14 Drawing Figures

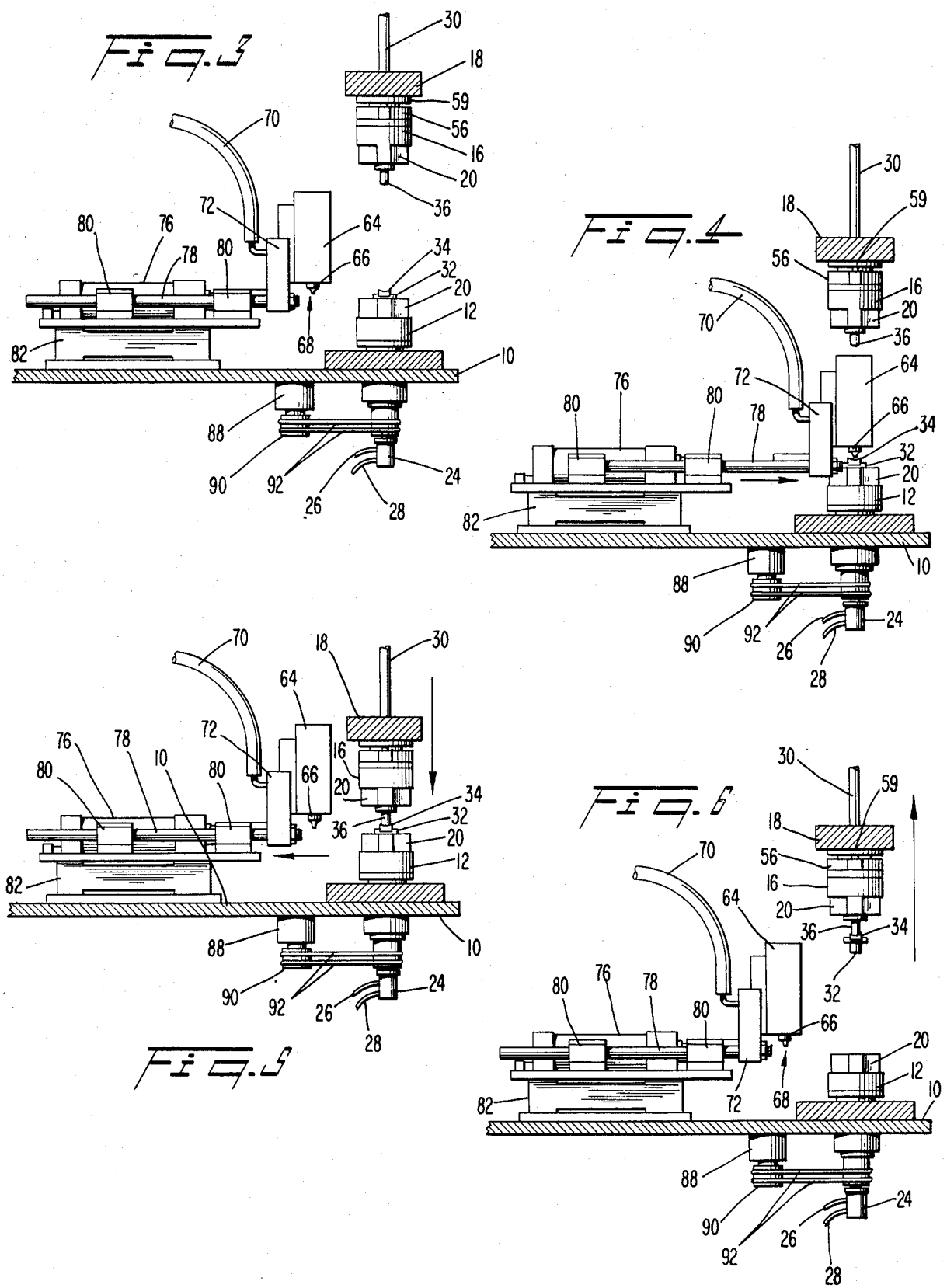

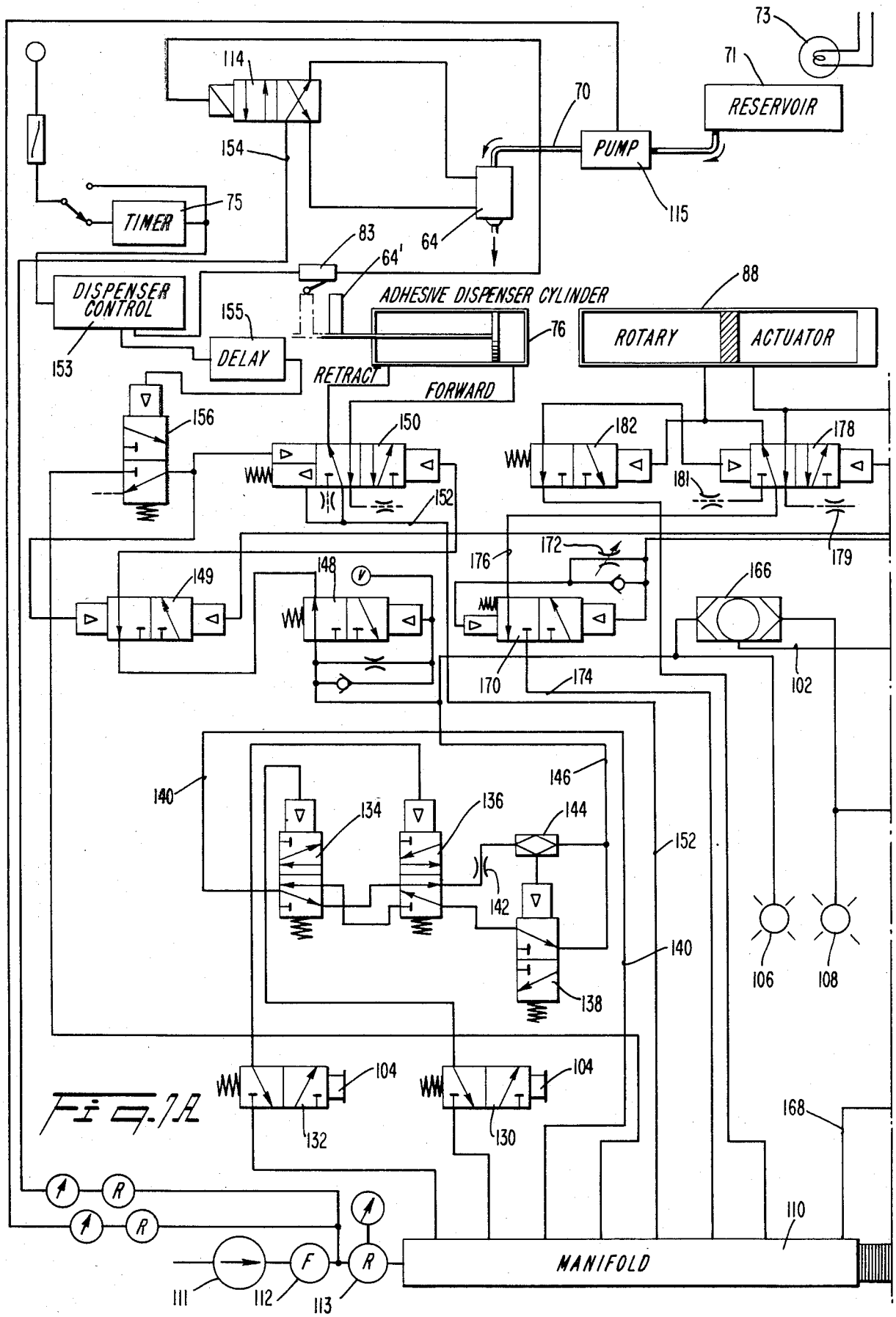

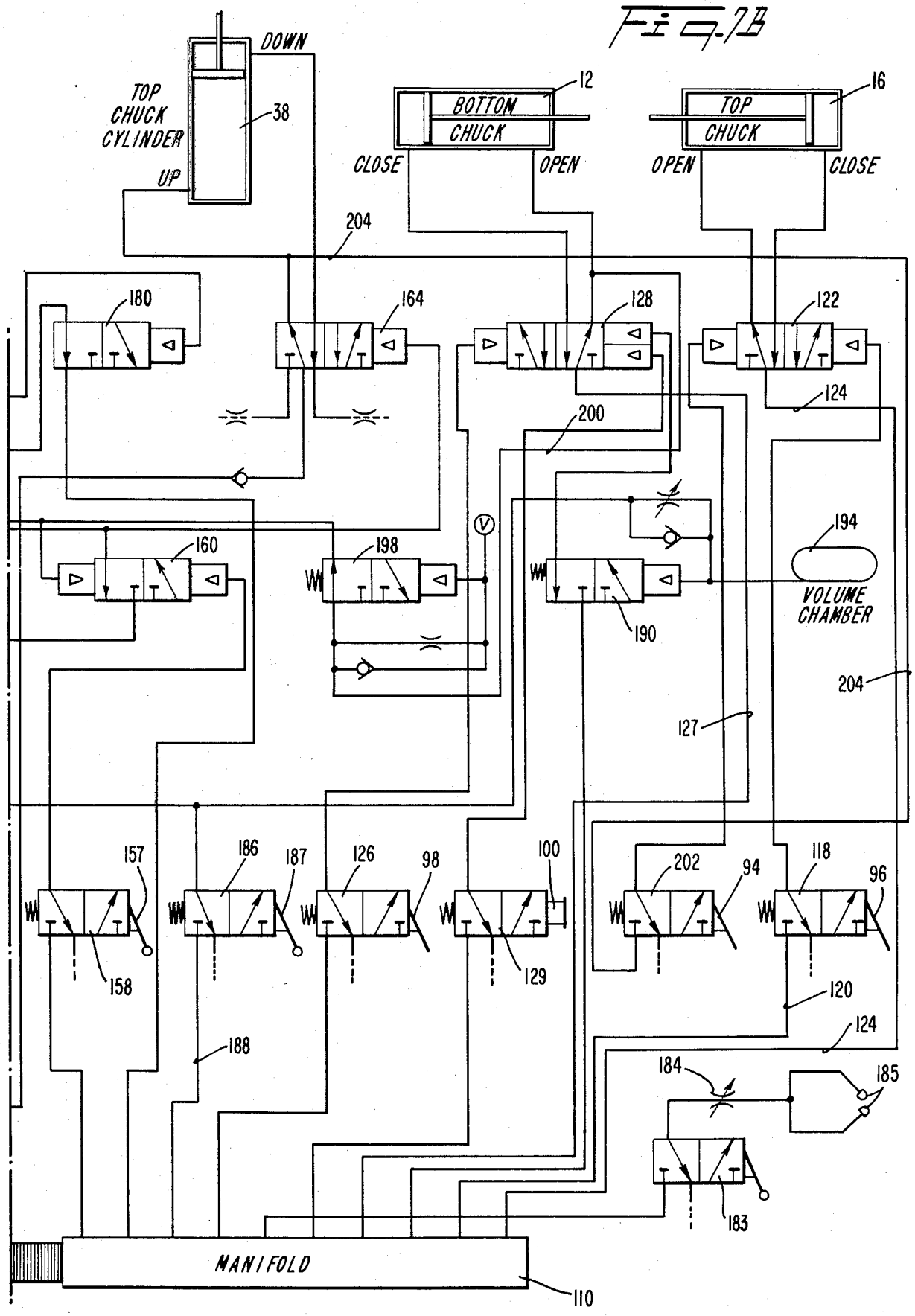

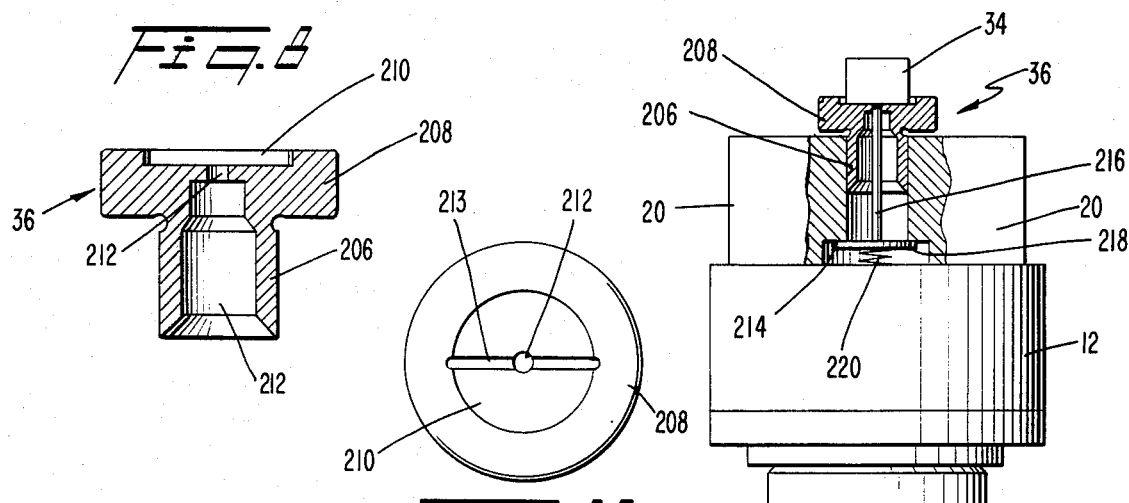
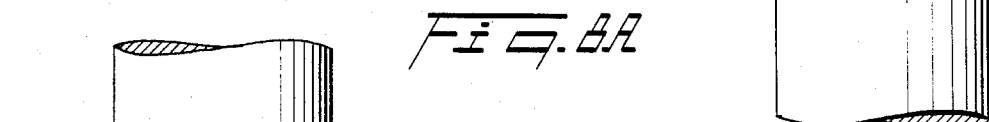
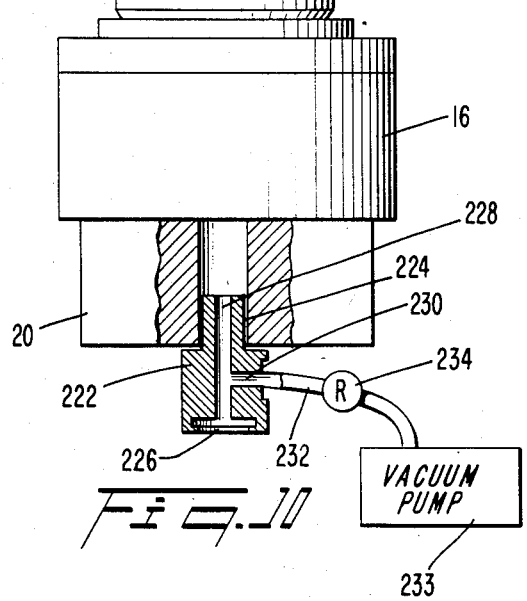
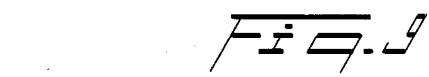
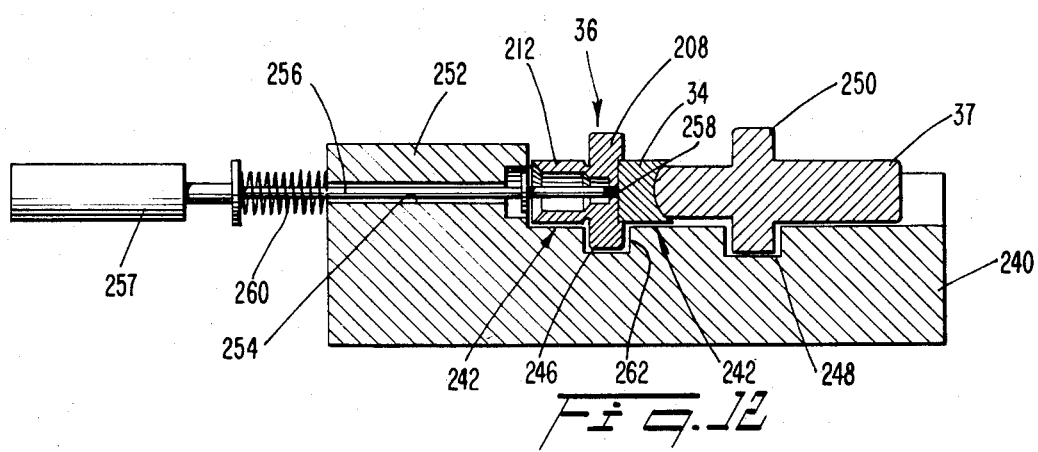

METHOD AND APPARATUS FOR ADHERING A WORKPIECE TO A SUPPORT BLOCK

BACKGROUND OF THE INVENTION

The present invention relates to a method and apparatus for adhering a work piece to a support member for subsequent use in a machine tool or the like, and more particularly to a method and apparatus for aligning and mounting an optical lens precursor, e.g., a contact lens button or blank, on a pitch block for subsequent insertion in a lathe to fabricate an optical lens.

In one method for the manufacture of optical lenses, a substantially cylindrical lens precursor is inserted in a lathe. A curve, for example, a concave or base curve, is cut into one of the end surfaces of the precursor with a cutting tool. The position of the precursor in the lathe is then reversed, and a power curve is cut in the opposing surface of the precursor to produce an optically efficient lens. A method and apparatus for performing such cutting operations, along with a preferred lens structure, are disclosed in more detail in commonly assigned U.S. application Ser. No. 928,978 filed July 28, 1978, the disclosure of which is hereby incorporated by reference thereto.

During the cutting operation, the lens precursor should not be compressed or otherwise have any forces exerted thereon, to thereby avoid having the precursor assume a shape other than that which it naturally assumes in the absence of these forces. For example, if the precursor is made from a resilient material, such as a hydrophilic polymer used for soft contact lenses, and the precursor is supported in the lathe by means of a chuck or the like which applies a radial compression force thereto, the curve which is cut into the surface of the precursor may become distorted when the precursor is removed from the chuck and resumes its natural shape. This problem becomes particularly acute in the manufacture of contact lenses and other optical elements requiring very precise tolerances. Any slight distortion of the curve upon removing it from the chuck may take it out of the tolerance range of the particular prescription for which it is designed, thereby rendering it useless for its desired purpose and resulting in substantial waste.

Therefore, it is necessary to support the lens precursor in the lathe in a manner which will not exert any distorting forces on the precursor. This function is generally accomplished by adhering a support block, commonly referred to as a "pitch block," to the surface of the precursor opposite the surface on which the curve is to be cut. The pitch block can then be inserted into a chuck on the lathe and clamped thereby to support the precursor in the lathe without exerting any distorting forces thereon.

In the past, the mounting of a lens precursor on a pitch block has generally been carried out in a manual operation. An operator would dip one end of the pitch block into a pool of liquid adhesive, or pitch. The pitch block would then be placed on a rotating support, such as a potter's wheel, with the adhesive end up. The operator would manually center the block on the wheel. Once the pitch block is centered to the best of the operator's capability, the lens precursor is then placed on the adhesive end of the pitch block and centered thereon, using only the operator's hands and eyes as alignment guides.

This manual operation for mounting a lens precursor on a pitch block possesses numerous disadvantages, the foremost of which is the limited accuracy of alignment which can be obtained. In the manufacture of optical lenses, and in particular for contact lenses, it is essential that the two surfaces cut on opposite sides of the precursor be concentric. If they are not, the desired optical correction cannot be obtained with the resulting lens. Using only their eyes as a guide, even the most skilled operators are only able to obtain concentricity within 0.004 to 0.005 inch. As lenses become smaller and thinner, this tolerance range may not be adequate to achieve the desired optical effects. Furthermore, the human factor present in the precursor mounting operation substantially reduces the controlled repeatability which can be obtained in such an operation.

In addition to the alignment accuracy and repeatability problems, another problem attendant with the prior art mounting operation is the amount of time which is consumed for each operation. In view of the fact that the operator is required to visually align and check each precursor as it is mounted, each mounting operation will consume a substantial amount of time. Thus, the output capabilities of each operator are correspondingly limited. In addition, it will be appreciated that the mounting operation requires a skilled operator, further adding to the cost of fabrication of the lens.

OBJECTS OF THE INVENTION

It is therefore an object of the present invention to provide a novel semi-automatic method and apparatus for mounting a work piece on a support block.

It is another object of the present invention to provide a novel method and apparatus for mounting a work piece on a support block which substantially reduces the need for skilled manual operations.

It is a further object of the present invention to provide a novel method and apparatus for mounting a work piece on a support block which can achieve accuracy of alignment of the work piece on the support block with controlled repeatability.

It is yet another object of the present invention to provide a novel method and apparatus for mounting a work piece on a support block which reduces the time necessary to perform such an operation.

It is yet a further object of the present invention to provide a novel method and apparatus for mounting a lens precursor on a pitch block which is capable of achieving concentricity of the cut surfaces of the lens within 0.0001 inch.

It is still another object of the present invention to provide a novel pitch block for use in a lathe during the cutting of the base curve in one surface of the lens precursor.

It is still a further object of the present invention to provide a novel method and apparatus for removing a lens precursor from a pitch block after an optical curve has been cut in one surface thereof.

BRIEF DESCRIPTION OF THE DRAWINGS

These, as well as other advantages and objects of the present invention will be appreciated upon a perusal of the following description of a preferred embodiment thereof in conjunction with the accompanying drawings in which:

FIGS. 3–6 are side views of the machine illustrated in FIG. 1, depicting the sequence of operation of the machine components in adhering a lens to a pitch block;

FIGS. 7A and 7B are a schematic diagrams of a fluidic circuit for controlling the timing and operation of the components of the pitch blocking machine;

FIG. 8 is a sectional side view of a pitch block for use in the first cutting operation of a lens precursor;

FIG. 8A is a top view of the pitch block illustrated in FIG. 8;

FIG. 9 is a sectional side view of the pitch block illustrated in FIG. 8 inserted in a chuck of the pitch blocking machine;

FIG. 10 is a side view in section of a device for holding a lens precursor inserted in a chuck of the pitch blocking machine;

FIG. 11 is a sectional side view of an alternative embodiment of a device for holding a lens precursor; and FIG. 12 is a sectional side view of a device for removing a lens precursor from a pitch block.

DETAILED DESCRIPTION

In order to elucidate the various objects and advantages of the present invention, the same will be described with reference to the preferred embodiment thereof, which relates to the alignment and mounting of a lens precursor on a pitch block. It will be appreciated, however, that the invention is applicable to the mounting of other types of work pieces to support blocks, and the following description is intended to be illustrative and in no way limitative.

Figure 1:
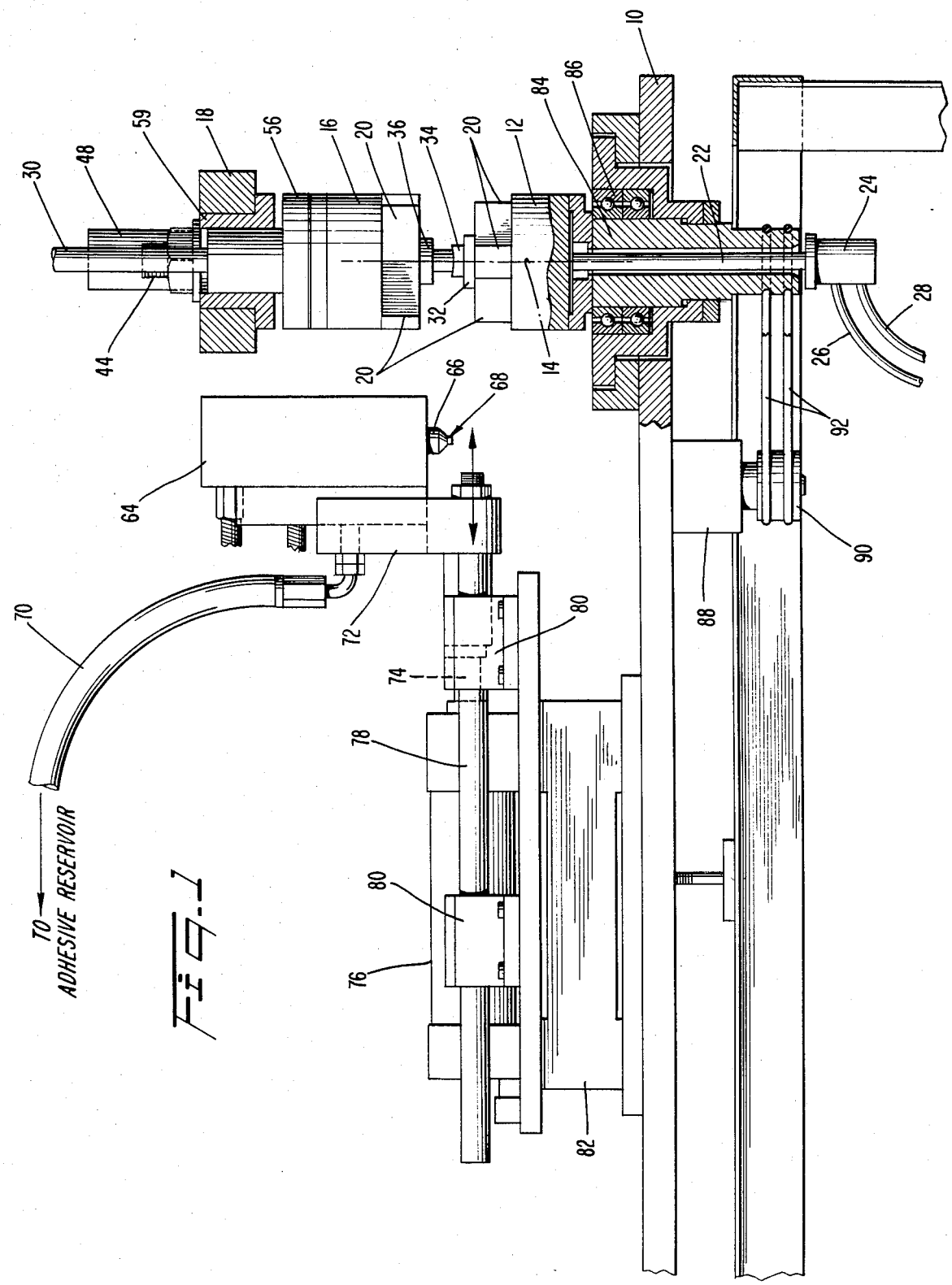
FIG. 1 is a side view in elevation and partial section of a machine for mounting a lens precursor on a pitch block constructed in accordance with the present invention.
Figure 2:
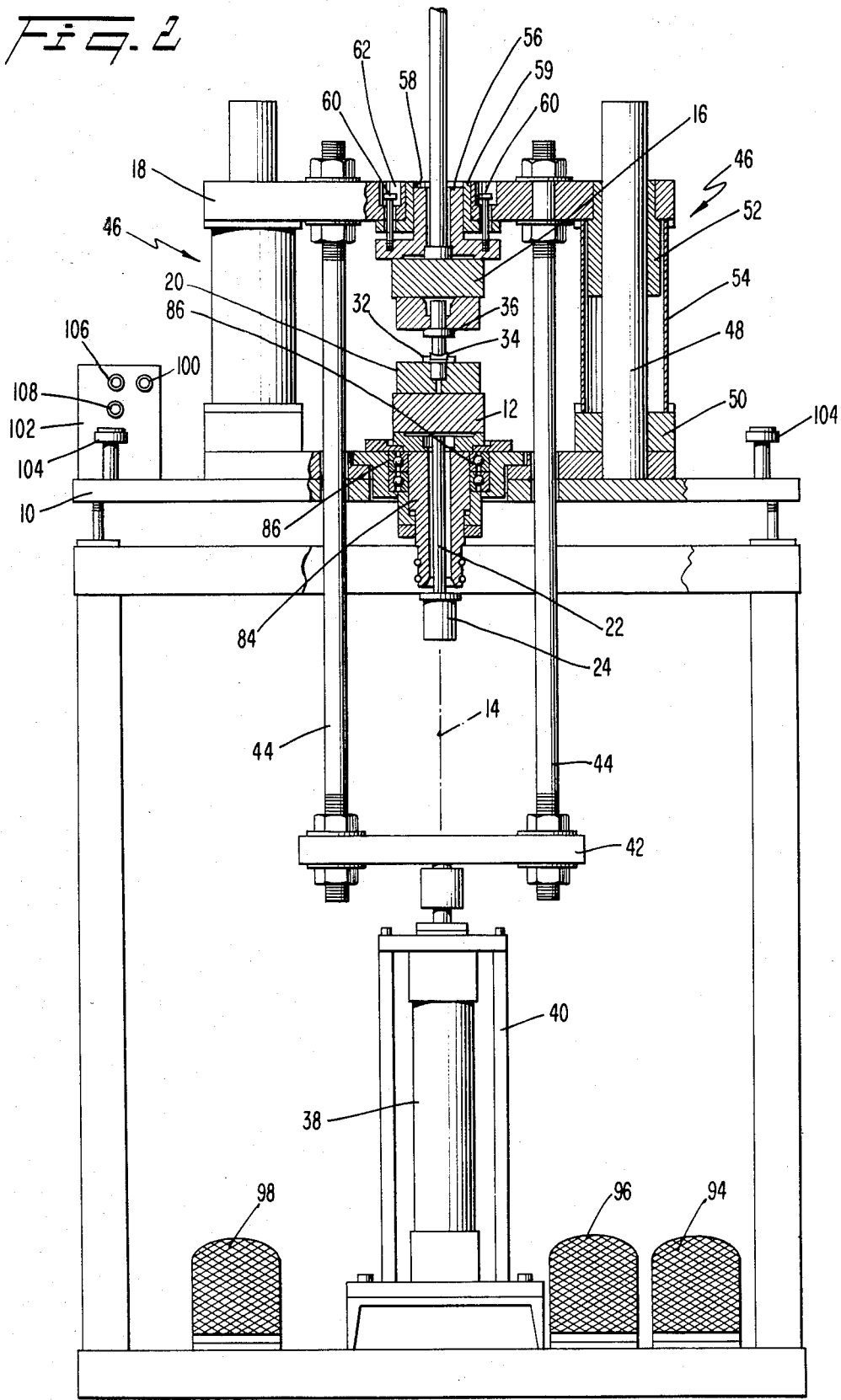
FIG. 2 is a front view in elevation and partial section of the machine illustrated in FIG. 1.

A pitch blocking machine constructed in accordance with the principles of the present invention is illustrated in FIGS. 1 and 2. The machine is mounted upon a base 10 for supporting the operative components of the machine at a height above the floor which is comfortable for a sitting or standing operator. The base 10 can be mounted on wheels (not shown) to provide for mobility and ease of storage of the pitch blocking machine. A bottom chuck 12 is rotatably mounted upon the base support 10. The longitudinal axis through the center of the bottom chuck defines a vertical alignment axis 14. A top chuck 16 is vertically aligned above the bottom chuck 12 such that its longitudinal axis is coaxial with the alignment axis 14. The top chuck 16 is mounted on a movable support member 18 for vertically translating the top chuck 16 along the alignment axis 14.

Each of the bottom and top chucks 12, 16, includes a plurality of jaws 20 circumferentially spaced around the alignment axis 14. For example, each chuck can include three jaws spaced 120° apart. Each of the jaws 20 is mutually translatable in a radial direction to clamp and release an object inserted in the respective chucks. The jaws 20 are preferably fluid operated. The bottom chuck 12 includes an air tube 22 and a hose coupling 24 for connecting the jaws 20 of the chuck to a pair of hoses 26, 28, which respectively supply fluid signals from a control circuit to open and close the jaws. Likewise, the top chuck 16 includes an air tube 30 and a hose coupling (not shown) for supplying fluidic control signals to operate the jaws and hence control the opening and closing of the chuck.

In the embodiment of FIG. 1, the bottom chuck 12 is shown clamping one type of a pitch block 32 which supports a lens precursor 34 therein. A second type of pitch block 36 is clamped in the top chuck 16. The lens precursor 34 illustrated in FIG. 1 has a concave base curve cut into the upper surface thereof. The lower surface of the pitch block 36 has a generally spherical surface for mating with base curve in the surface of the lens precursor 34.

The top chuck 16 is translated along the alignment axis 14 by means of the vertical movement of the support member 18. The movement of the support member 18 is controlled by means of an air actuated cylinder 38 (FIG. 2). The air cylinder 38 is preferably supported by means of a bracket 40 which rests upon the frame structure or other suitable support beneath the base 10. The air cylinder 38 is connected to a tie bar 42 which is in turn attached to the support member 18 by means of a pair of vertical rods 44. The tie bar 42 is moved between a lower position, illustrated in solid lines in FIG. 2, and an upper position by means of the air cylinder 38 to translate the top chuck 16 vertically along the alignment axis 14. To prevent binding of the rods 44 during translation, the connection between the tie bar 42 and the air cylinder 38 preferably provides a limited amount of spherical movement of the tie bar.

In order to ensure precise vertical alignment of the bottom and top chucks 12, 16, the support member 18 and the top chuck 16 are guided in their vertical movement by means of a pair of die assemblies 46. Each die assembly includes a vertical guide post 48 rigidly attached to the base 10 by means of a collar 50 or other suitable mounting device for maintaining the guide post 48 in a precisely fixed position with respect to the base 10 and the alignment axis 14. The exterior surface of the guide post 48 is precisely machined and supported on the base 10 such that the vertical surface thereof is parallel to the alignment axis within the acceptable tolerance range of concentricity to be obtained between the pitch block 36 and the lens precursor 34. Each die assembly 46 also includes a guide bushing 52 rigidly attached to the support member 18 for sliding along the guide post 48. The inner diameter of the guide bushing 52 has a dimension such that movement of the bushing in a direction perpendicular to the alignment axis during vertical movement of the bushing along the guide post 48 is within the acceptable tolerance range for concentricity of the pitch block 36 and lens precursor 34. Thus, the guide post 48 and the guide bushing 52 precisely define the movement of the top chuck 16 so that concentricity of the top and bottom chucks 16, 12, can be produced within a desired tolerance range with controlled repeatability.

Each die assembly 46 also includes an exterior tube 54 attached to the mounting collar 50. The tube 54 functions as a stop which defines the lowermost point of travel of the support member 18 during its downward vertical movement. The height of the tube is dimensioned such that the pitch block 36 comes into contact with the lens precursor 34 during its downward vertical movement prior to the time that the support member 18 abuts the top edge of the tube 54.

The top chuck 16 is attached to the support member 18 in a manner which permits relative vertical movement between them. To provide this feature, the top chuck 16 is rigidly attached to a flanged support sleeve 56. The smaller diameter portion of the support sleeve 56 is inserted into a central bore 58 in the support member 18. A bushing 59 can be interposed between the support sleeve 56 and the support member 18 to provide improved vertical alignment of the support sleeve and the support member 18 and to facilitate relative movement between them. The support sleeve 56 is attached to the support member 18 by means of shoulder screws 60 countersunk in recesses 62 in the support member 18 and threaded to the flanged portion of the support sleeve 56. Rather than tightly fastening the support sleeve 56 to the support member 18, the shoulder screws 60 are threaded into the support sleeve 56 only a predetermined distance so as to leave a space between the support sleeve 56 and bushing 59 when no upward force is applied to the top chuck 16. The shoulder screws 60 are vertically slidable within the recesses 62 to provide for relative movement between the top chuck 16 and the support member 18.

The relative movement between the top chunk 16 and the support member 18 provides a twofold purpose. First, it prevents the force extorted by the air cylinder 38 and the weight of the support member 18, tie bar 42, rods 44, and guide sleeves 52 from acting upon the pitch block 36 and the lens percursor 34. Rather, the only force exerted on these two members is the weight of the chuck 16 and its associated mounting and control components. Secondly, the relative movement accommodates varying distances between the bottom and top chucks 12, 16, during different mounting applications. For example, in some applications the lens precursor may be directly clamped by the jaws of the bottom chuck 12, while during other applications the precursor may be mounted on a pitch block 32 as illustrated in FIG. 1. The relative movement of the top chuck 16 with respect to the support member 18 enables the pitch block 36 to come into contact with the lens precursor 34 regardless of the spacing between them at the initiation of the mounting operation.

A compression spring (not shown) is preferably inserted around each shoulder screw 60 between the bottom of the recess 62 and the shoulder defined by the head of the bolt. The springs cushion the impact between the bolts and the support member 18 to thereby control the movement of the top chuck 16 and inhibit any sudden jerking of the chuck which could place unnecessary strain on the adhesive bond between the pitch block and the lens precursor.

Referring again to FIG. 1, the pitch blocking machine also includes apparatus for depositing a predetermined amount of adhesive on a precursor or pitch block mounted in the bottom chuck 12. The adhesive depositing appartus includes an adhesive dispenser 64, such as a hot melt gun, for example. The gun 64 includes a dispensing nozzle 66 having an orifice 68 located on the underside thereof. Molten adhesive is supplied to the gun 64 by means of a hose 70 connected to a supply tank 71 (FIG. 7) for preheating and storing the adhesive. The supply tank can be mounted on the base 10 to the left of the apparatus shown in FIG. 1. It can include a decontaminant light 73, such as an ultraviolet light, for example, to sterilize or otherwise neutralize any impurities which may get into the molten adhesive within the tank, an important consideration particularly in the fabrication of soft contact lenses.

The liquid adhesive is automatically metered within the dispenser 64. In response to an electrical, air or hydraulic signal, the dispenser 64 dispenses a predetermined amount of the adhesive through the output orifice 68.

The supply tube 70 is preferably electrically heated to maintain the adhesive in a molten state at a predetermined temperature while it travels from the supply tank to the dispenser 64. When the adhesive reaches the dispenser 64, it is further heated to a predetermined optimum temperature to produce desired flow characteristics. This temperature is preferably at least 15°-20° C. below the glass transition temperature of the lens precursor material. The heaters within the supply tank, supply tube 70 and dispenser 64 are preferably activated by means of a timer 75 (FIG. 7) which energizes the heaters a suitable time period, e.g. 2½ hours, prior to the beginning of a work day or production cycle, to thereby ensure that the adhesive is in a molten state at the beginning of the production cycle.

The adhesive dispenser 64, supply tube 70 and heated supply tank can be any suitable conventional apparatus for dispensing a predetermined metered amount of liquid adhesive. One such device suitable for use in the context of the present invention is the DYNAPPLY 21DH Adhesive Supply Unit marketed by the LTI Corp. of Monterey, Calif. A suitable adhesive is Kerr Dental Impression Compound, Type 1, Class 1, which has been approved by the FDA for use with soft contact lenses. Other commercially available adhesive supply units and adhesive compounds suitable for use in the present invention will be readily apparent to those of ordinary skill in the art.

The adhesive dispenser 64 is mounted upon a bracket 72 for translation along a substantially horizontal axis intersecting the vertical alignment axis 14. The bracket 72 is connected to the movable piston rod 74 of an air actuated cylinder 76. To support the bracket 72 and adhesive dispenser 64 and prevent them from rotating about the horizontal axis defined by the piston rod 74, a pair of guide rods 78 are attached to either side of the support bracket 72 and are horizontally slidable in suitable bearings 80. The air cylinder 76 and bearings 80 are secured to a base member 82 mounted on the base 10.

The air cylinder 76 controls the translation of the adhesive dispenser 64 between its retracted position illustrated in FIG. 1 and an operative position in which the dispensing orifice 68 lies on the vertical alignment axis 14 where it is in position to dispense adhesive onto a work piece clamped in the bottom chuck 12. The pitch blocking machine includes a micro-switch 83 (FIG. 7) which is closed when the adhesive dispenser 64 reaches its operative position to send a signal to the adhesive dispenser to dispense a metered amount of adhesive onto the work piece located in the bottom chuck 12. It will be apparent that a suitable detecting device other than a micro-switch can also be used to send an actuating signal to the adhesive dispenser 64 when the dispenser reaches its operative position.

The operation of the air cylinder 38 for controlling the vertical movement of the top chuck 16 and that of the air cylinder 76 for controlling the horizontal translation of the adhesive dispenser 64 are interconnected so that the top chuck 16 can only move downwardly from its uppermost position when the adhesive dispenser 64 is in its retracted position, to thereby prevent damage to the machine components and work pieces located in the chucks. In addition, any movement of the adhesive dispenser 64 from its retracted position should immediately cause the top chuck 16 to be raised to its uppermost position if it is not already in this position.

The bottom chuck 12 can be mounted on a spindle 84 rotatably supported on the base 10 by means of bearings 86. The bottom chuck 12 and spindle 84 can be rotated by means of a fluidically operated, reciprocating rotary actuator 88 mounted on the underside of the base 10. The rotary actuator 88 includes a spindle 90 connected to the chuck spindle 84 by a suitable connecting link 92 for producing concurrent rotation of the two spindles. It has been found preferable to utilize a chain as a connecting link 92 rather than a pulley belt since the tension necessary for a belt to produce rotation of the spindle 84 may provide a radial load sufficient to disturb the concentricity of the bottom chuck 12 and the top chuck 16. A chain can have some slackness therein and still provide rotation of the chuck spindle 84, and is therefore preferable since it does not produce as great a load on the spindle.

It will be appreciated that other types of devices for producing rotary motion, such as electric motors, for example, can be used to produce rotation of the bottom chuck 12.

The operation of the rotary acuator 88 can be tied to the vertical movement of the top chuck 16 so that as the chuck begins its downward movement to bring the two work pieces into engagement with each other, the rotary actuator will be actuated to produce rotation of the spindle 84 and bottom chuck 12 relative to the top chuck 16. Thus, as the pitch block 36 is brought into contact with the lens precursor 34, the adhesive at the interface of the pitch block 36 and the lens precursor will be more evenly spread between their mating surfaces by the rotation of the precursor 34 relative to the pitch block 36. It is only necessary for the lower chuck 12 to make a few revolutions relative to the upper chuck 16 as the pitch block 36 and lens precursor 34 first come into contact. For example, eight rotations have been found to be sufficient to achieve the desired function of spreading the adhesive evenly between the interfacing surfaces. Thus, the rotary actuator 88 can be deenergized shortly after it has been actuated, by means of a suitable time delay, for example. Alternatively, a limit switch for indicating when the support bar 18 has reached its lowermost position can be used to deenergize the rotary actuator.

The manually actuated controls for operating the pitch blocking machine are illustrated in FIG. 2. In order to enable an operator to grasp a work piece, such as a pitch block or a lens precursor, while inserting or removing the work piece from the chucks 12, 16, the chucks are preferably operated by means of foot pedals. First and second foot pedals 94 and 96 can be selectively actuated to open and close, respectively, the jaws of the top chuck 16. A third foot pedal 98 can be actuated to close the jaws of the bottom chuck 12. It is not necessary to provide a foot pedal for opening the jaws of the lower chuck 12, since this operation is performed automatically during the operating sequence of the pitch blocking machine, as described in detail hereafter. However, to enable an operator to open the lower chuck manually in case the wrong work piece has been inserted in the chuck or in case a work piece has been inserted incorrectly, a manually operated button 100 can be provided on a control panel 102, for example.

Once an operator has inserted the work pieces into the chucks 12, 16, and closed them by actuating the foot pedals 96 and 98, the remaining sequence of operations of the pitch blocking machine can be carried out automatically. The automatic operation is initiated by depressing a push button 104 to open a fluid valve in a timing circuit which controls the operation of the machine. Preferably, two such push buttons 104 are located on either side of the machine and spaced from the moving components thereof. The buttons 104 must be actuated simultaneously and maintained actuated to initiate the automatic sequence of events and maintain the machine in operation, at least until the upper chuck 16 has reached its lowermost point of travel in the operational sequence of events. Thus, by requiring the operator to simultaneously depress and maintain two spaced apart push buttons, the operator's hands will necessarily be disposed out of the way of the moving parts of the machine, thereby preventing industrial accidents which may be caused, for example, when the moving parts of the machine come into engagement with one another.

The automatic sequence of events performed by the pitch blocking machine will now be explained with reference to FIGS. 3–6. In this example, a pitch block having a spherically shaped end portion, labelled a "second operation pitch block", is adhered to a lens precursor having a concave base curve cut into one surface thereof. An operator first places the second operation pitch block 36 into the top chuck 16 and closes the jaws of the chuck by operating the foot pedal 96. The lens precursor and a first operation pitch block to which it is adhered are placed into the bottom chuck 12 and its jaws are closed by actuating the foot pedal 98.

The operator then depresses each of the push buttons 104 simultaneously and maintains them depressed to send a signal that his hands are out of the way of the moving parts of the machine and it is safe to continue with the pitch blocking operation. Upon continuous generation of this signal by the operator, the air cylinder 76 is actuated to move the adhesive dispenser 64 to its operative position (FIG. 4). When the dispenser reaches its operative position, it actuates the micro-switch 83 to provide an energizing signal to the adhesive dispenser and thereby deposit a predetermined amount of adhesive on the lens precursor in the bottom chuck. Once the adhesive has been desposited, the adhesive dispenser is moved to its retracted postion.

As soon as the adhesive dispenser reaches its retracted position, the air cylinder 38 is actuated to bring the top position, the air cylinder 38 is actuated to bring the top chuck 16 to its lowermost position, thereby engaging the pitch block and the lens precursor (FIG. 5). Simultaneously with the downward movement of the pitch block, the rotary actuator can be energized to rotate the bottom chuck and the lens precursor to thereby spread the adhesive more evenly between the pitch block and the precursor as they come into engagement. After a few revolutions of the precursor, the rotary actuator is deenergized and the top chuck 16 remains in its lowermost position for a predetermined time period while the adhesive cools and hardens to attach the lens precursor to the pitch block. In order to increase the rate of cooling of the adhesive, one or more streams of air can be directed at the interface of the pitch block and the lens precursor to remove heat from the adhesive. This feature will decrease the waiting period during which the top chuck 16 is in its lower position and thereby increase the rate of production.

At the termination of the adhesive cooling period, the jaws of the bottom chuck 12 are automatically opened to thereby release the lens precursor. Once the bottom chuck is opened, the top chuck 16 is raised to its uppermost position, carring the pitch block and the attached lens precursor with it (FIG. 6). The automatic opening of the jaws of the bottom chuck prior to the raising of the top chucks prevents unnecessary strain on the adhesive nond between the lens precursor and the pitch block. Once the top chuck has reached its uppermost position, the operator actuates the foot pedal 94 to open the jaws of the top chuck, thereby releasing the pitch block into his hand. The machine is then ready to begin the next pitch blocking operation.

During the course of preparation of an optical lens, two different pitch blocking operations are carried out. In the first operation, an uncut lens precursor, commonly referred to as a "button," having a generally cylindrical shape with two planar surfaces, is mounted on a first type of pitch block herein referred to as a "first operation pitch block." The first operation pitch block has a shape such as that illustrated at 32 in FIGS. 1, 8 and 9.

In the second pitch blocking operation, a second operation pitch block, such as that shown at 36 in the various Figures, is adhered to the surface of the precursor into which the base curve has been cut. A preferred embodiment of a second operation pitch block is described in more detail in the previously cited copending application. Among other features, it has a spherical surface located a precisely defined distance from the support surface of a flange on the pitch block. By precisely controlling the thickness of the adhesive layer between the second operation pitch block and the lens precursor, the exact location of the precursor in a cutting lathe can be determined within 0.0001 inch. This enables an extremely thin lens to be cut with great precision.

One method for controlling the thickness of the adhesive layer is through control of the temperature of each of the adhesive and the second operation pitch block. As discussed previously, the adhesive is heated in the dispenser 64 to an optimum temperature which produces desired adhesive flow without affecting the desired bonding characteristics of the adhesive. In addition, the pitch block is heated to a temperature which further stabilizes the flow characteristics of the adhesive during the pitch blocking operation. When optimum flow characteristics are obtained, the adhesive will be present at the periphery of the precursor-pitch block interface but will not be present at the center thereof when the precursor and pitch block are brought together. Since the precursor and pitch block are therefore in direct contact at their centers, the precise location of the base curve on a precursor in the lathe will be known within the tolerance range of the pitch block surface, and hence a thin lens can be manufactured with greater precision.

One embodiment of a circuit for controlling the automatic sequence of operations of the pitch blocking machine is illustrated in FIG. 7. The particular embodiment disclosed herein is basically a fluid circuit in which pressurized air provides almost all of the control and actuating signals. It will be appreciated, however, that other types of circuits, such as electrical circuits, can also be used to carry out the control of the pitch blocking machine.

Pressurized air is provided to a supply manifold 110 for the control circuit by means of a pump 111. The pressurized air can pass through a filter 112 and a pressure regulator 113 prior to entering the supply manifold 110. The pressurized air can also be supplied to a 4-way valve 114 for controlling the adhesive dispenser 64 and to a reciprocating air pump 115 for transferring the liquid adhesive from the supply reservoir 71 to the dispenser 64.

The remaining components of the fluid control circuit can best be explained with reference to the operational sequence of the pitch blocking machine. At the initiation of the pitch blocking operation, the various movable control elements of the circuit occupy the positions shown in the schematic diagram of FIG. 7.

As explained previously, the operator first places a work piece in each of the bottom and top chucks 12, 16. To close the top chuck 16, the operator actuates a foot pedal 96. Actuation of the foot pedal 96 opens a normally closed valve 118 to send a supply of pressurized air in a manifold output line 120 to one pilot port of a double piloted, two-position valve 122. This pilot signal causes the valve 122 to connect the "close" port of the top chuck 16 with a manifold output line 124 to thereby close the top chuck 16. The valve 122 maintains the top chuck closed until a pilot signal is recieved at its other pilot port.

In a similar manner, actuation of the foot pedal 98 by the operator opens a normally closed valve 126 to send a pilot signal to a double piloted valve 128 to close the bottom chuck 12 by means of the pressurized air in a manifold output line 127 and maintain the chuck closed until an opening pilot signal is received. The bottom chuck 12 can be manually opened by depression of a push button 100, which opens a normally closed valve 129 to supply a pilot signal.

Once the work pieces have been clamped into the chucks, the operator simultaneously depresses the push buttons 104 to initiate the automatic operation of the machine. The push buttons 104 are respectively connected to a pair of normally closed valves 130, 132. The normally closed valves are respectively connected with the pilot ports of two four-way valves 134, 136 connected in series. The second four-way valve 136 is connected to a normally closed three-way valve 138. When neither push button 104 is depressed, the three-way valve 138 is held open by means of the pressurized air from a manifold output line 140 which passes through each of the four-way valves 134, 136, a restriction 142 and a shuttle valve 144 which supplies the air to the pilot port of the three-way valve 138. In this position the output line 146 of the three way valve 138 is exhausted to atmosphere by the second four-way valve 136.

When only one of the push buttons 104 is actuated, for example to open the normally closed valve 130 and thereby actuate the first four-way valve 134, the pilot air for the three-way valve 138 flows back through the shuttle valve 144, the restriction 142, the four-way valve 136 and the four-way valve 134 to atomsphere. The three-way valve 138 is closed by spring bias to maintain the output line 146 connected to atmosphere. When only the other push button 104 is actuated, the same sequence occurs except that the pilot air is exhausted through the second four-way valve 136.

When both push buttons 104 are actuated simultaneously, the supply air from the manifold output line 140 is directed through the two four-way valves 134, 136 and through the open three-way valve 138 to the output line 146. Part of the output pressure also goes to the shuttle valve 144 to maintain the three-way valve 138 open. The restriction 142 provides a short time delay in the exhaustion of the pilot signal to prevent the three-way valve 138 from closing prior to the time the output pressure in the line 146 is supplied to the valve's pilot port through the shuttle valve 144.

The pressurized air output signal in the supply line 146 is provided to an indicator light 106 to actuate the same, e.g. by means of a pressure sensitive switch. The light 106 can be red, for example, to provide a warning to the operator that his hands must remain on the buttons 104 during the period in which the machine components are moving.

The output signal in the output line 146 is also supplied to a pulse valve 148. The pulse valve 148 is a normally open valve which closes a predetermined time period after a signal is received at its input port and remains closed until the input signal is exhausted. Thus, the pulse valve 148 produces an output pulse of a predetermined duration in response to simultaneous depression of the two push buttons 104. This output pulse passes through an open three-way valve 149 and is supplied as a pilot signal to a four-way safety valve 150. The safety valve 150 normally supplies pressurized air from a manifold output line 152 to the "retract" port of the adhesive dispenser cylinder 76 to maintain the dispenser in a retracted positon. However, in response to the pilot signal, the safety valve 150 connects the manifold output line 152 to the other input port of the cylinder 76 to move the dispenser to its forward operative position. If the pilot signal from the pulse valve 148 should suddenly be interrupted, for example, by release of one or both of the push buttons 104, the safety valve 150 will automatically return to its normal position to retract the adhesive dispenser.

When the adhesive dispenser 64 reaches its forward operative position, it will trip the micro-switch 83. Closing of the micro-switch 83 will transmit a control signal from a dispenser control circuit 153 to the electronically controlled four-way valve 114. The valve will be actuated to momentarily cut off the supply of pressurized air from a supply line 154 to the adhesive dispenser 64, thereby causing the dispenser to deposit adhesive on the work piece clamped in the bottom chuck.

The dispenser control circuit 153 forms part of the conventional adhesive supply unit and controls the duration of the signal to the valve 114 to control the amount of adhesive released during each operation of the dispenser 64. The dispenser control circuit 153 preferably has a selector switch to enable different amounts of adhesive to be deposited during the first and second pitch blocking operations. Upon closing of the micro-switch 83, the dispenser control circuit 153 produces an output signal which is fed to a delay circuit 155. The delay circuit can be a variable time delay relay switch, for example, to provide a variable dwell period, such as 0-20 seconds, for example, during which the dispenser 64 is in its forward operative position.

At the end of the dwell period, the signal will be passed to an electronic valve 156, to open the valve and send a pilot signal to the other pilot port of the safety valve 150. The signal from the valve 156 is also applied as a pilot signal to the three-way valve 149, causing the valve to close and cut off the first pilot signal to the safety valve 150. The actuation of the safety valve 150 by the pilot signal from the electronic valve 156 redirects the supply of pressurized air in the manifold output line 152 to retract the adhesive dispenser.

When the adhesive dispenser reaches its fully retracted position, it depresses an actuator 157 to open a normally closed valve 158. Opening of the valve 158 sends a pilot signal to a normally closed three-way valve 160. The pilot signal opens the valve 160 to connect a supply line 162 to the pilot port of a spring biased four-way valve 164. If the two push buttons 104 remain depressed at this time, the pressurized air in the output line 146 will be supplied to the supply line 162 by means of a shuttle valve 166. Thus, the closing of the three-way valve 160 will send a pilot signal to the four-way valve 164, actuating the valve to connect a manifold output line 168 to the top chuck cylinder 38 to bring the top chuck 16 down to its lowermost position. If, however, one or both of the push buttons 104 has been released, pressurized air will not be supplied to the supply line 162, and therefore no pilot signal will be applied to the four-way valve 164. Thus, the top chuck 16 will remain in its uppermost position, thereby preventing possible injury to the operator.

Simultaneously with the sending of a pilot signal to the four-way valve 164, the three-way valve 160 also sends a pilot signal to one pilot port of a normally closed delay valve 170. The pilot signal causes the valve 170 to open for a predetermined period of time, the length of which is established by the setting of an adjustable restriction 172. While the valve is open during the predetermined time period, a manifold output line 174 will be connected to an output line 176 to supply pressurized air thereto. At the end of the predetermined delay period, a pilot signal will be supplied to the other pilot port of the delay valve 170. The two pilot signals will cancel each other out, causing a spring bias on the valve 170 to return it to its closed position, thereby cutting the manifold output line 174 off from the valve output line 176.

The pressurized air signal in the output line 176 is supplied to the input port of a double piloted four way valve 178 and is passed by the valve 178 to one inlet port of the control cylinder for the rotary actuator 88. The pressurized air in one portion of the cylinder translates a piston within the cylinder in one direction, and this translation is converted into rotary motion by the actuator. Movement of the piston creates a back pressure in the other portion of the cylinder, which is increased by means of a restriction 179 in the exhaust port of the four way valve 178. This back-pressure is supplied to the pilot port of a normally open three way valve 180 to maintain the valve closed.

When the piston of the rotary actuator has reached the end of its travel, the back pressure will diminish, due to the open exhaust port of the four way valve 178, and the pilot signal to the three way valve 180 will be terminated. The valve 180 will then open, to supply a pilot signal to the four way valve 178. The valve will be actuated to pass the pressurized air signal in the output line 176 to the other inlet port port of the rotary actuator 88, thereby causing the piston to move in the other direction. The back pressure created by the moving piston will now be exhausted through a restricted output port 181 on the four way valve 178 and will be applied as a pilot signal to a normally open three way valve 182. When the piston reaches the end of its travel, the pilot signal will diminish and the valve 182 will open to supply a signal to the other pilot port of the four way valve 178, causing the valve to again shift its position and begin movement of the piston in the other direction.

The valves 178, 180 and 182 will continue to operate in this fashion to provide alternating signals to the rotary actuator 88 for the duration of the output signal from the delay valve 170, thereby translating the piston in both directions and causing the actuator to produce reciprocating rotary motion. The adjustable orifice 172 is preferably set so that the rotary actuator 88 produces about eight revolutions during the duration of the delay valve output signal.

Once the top chuck 16 reaches its lower position, it depresses an actuator to open a normally closed valve 183. The valve 183 supplies pressurized air from the manifold 110 through an adjustable restriction 184 to a pair of nozzles 185. These nozzles direct the air from the manifold towards the precursor-pitch block interface to increase the rate of cooling of the adhesive.

When the top chuck 16 reaches its lowermost position, it also presses an actutator 187 to open a normally closed valve 186. The opening of this valve connects a manifold output line 188 to another input port of the shuttle valve 166. The shuttle valve thereby continues to supply pressurized air to the supply line 162 to maintain the top chuck in its lowermost position. Thus, once the top chuck has reached it lower position, the operator can release the push buttons 104 since the engagement of moving parts with one another has now been completed and the time period in which safety hazards are present has passed. The pressurized air from the manifold output line 188 is also supplied to a second indicator light 108, for example a green light, to indicate to the operator that it is now safe to release the push buttons 104.

The supply of pressurized air from the manifold output line 188 is further provided as a pilot signal to a normally closed delay valve 190. The pilot signal is delayed by means of an adjustable restriction 192 and is supplied to a volume chamber 194. After a predetermined time period, determined by the size of the restriction 192 and the volume of the chamber 194, the pilot signal will be supplied to the pilot port of the delay valve 190, causing the valve to open. Opening the valve supplies a pressurized air signal from a manifold output line 196 to the third pilot port of the four-way valve 128. This pilot signal causes the valve 128 to return to its original position, thereby connecting the manifold output line 127 to the bottom chuck 12 so as to open the jaws of the chuck.

The adjustable restriction 192 allows the dwell time of the top chuck 16 in its lower position to be varied in accordance with the requirement for various pitch blocking operations. For example, during the second pitch blocking operation in which the pitch block is heated, a longer cooling period is required. The adjustable restriction 192 allows the dwell time to be lengthened to satisfy this requirement.

The pressurized air signal from the valve 128 which causes the jaws of the bottom chuck 12 to open is also supplied to a normally open pulse valve 198 by means of a line 200. The pulse valve 198 is initially open and produces a short pulse of pressurized air. The valve closes when a delayed signal from the line 200 is applied to the valve's pilot port and it remains closed for the duration of the pressurized signal in the line 200. The output pulse from the valve 198 is supplied as a pilot signal to the three-way valve 160 and causes the valve to shift to its closed position, thereby cutting off the pilot signal to the four-way valve 164. The valve 164 then returns to its normal position, connecting the manifold output line 168 to the top chuck cylinder 38 so as to move the chuck to its upper position. The output pulse from the valve 198 is also supplied to the pilot port of the three way valve 149 to open this valve in preparation for the next pitch blocking operation.

The pressurized air supplied to the top chuck cylinder 38 to move the chuck in an upward direction is also supplied to the input port of a normally closed valve 202 by means of a line 204. Depression of the foot pedal 94 by the operator causes the valve 202 to open, thereby supplying a pilot signal to the other pilot port of the four-way valve 122, returning the valve 122 to its original position. This will connect the manifold output line 124 to the top chuck 16 so as to open the jaws of the chuck, enabling the work piece in the chuck to fall into the hands of the operator. The cycle of operation of the pitch blocking machine is now complete and the machine is ready for the next operation.

Referring now to FIG. 8, one embodiment of a pitch block for use in the first pitch blocking operation is illustrated. The first operation pitch block 32 has a generally cylindrical body 206 and an integral flange 208 at one end thereof. A cylindrical recess 210 is disposed in the flanged end of the pitch block. The recess 210 has a diameter sufficient to accommodate a lens precursor. An axial bore 212 extends throughout the length of the pitch block. The bore 212 enables a tool, such as an elongated rod, to be inserted into the pitch block from the narrow end thereof to apply a controlled force against a lens precursor adhered in the recess 210 of the pitch block, to remove the precursor from the pitch block after a cutting operation has been completed.

In order to facilitate the transport of a pitch block having a lens precursor mounted thereon from a pitch blocking machine to a lens cutting lathe, the pitch block is dimensioned such that the center of gravity of the pitch block is located in its flanged portion 208. To achieve this property, the diameter of the central bore 212 is much greater in the narrow portion of the pitch block than in the flanged portion thereof. The axial bore 212 need only be sufficiently large enough at the flanged end of the pitch block to accommodate the precursor removing tool. The bore can be stepped to provide an opening of increased diameter in the narrow cylindrical portion of the pitch block, thereby removing some of its mass in this area of the pitch block to maintain the center of gravity in the flanged portion. With the center of gravity located in the flanged portion of the pitch block, the block will rest only on the flanged portion when it is laid on its side. With this arrangement, the pitch block with a lens precursor mounted thereon can be easily rolled down a magazine to transport the pitch block and lens precursor from a pitch blocking machine to the location of a lens cutting lathe.

As illustrated in FIG. 8A, the recess 210 of the pitch block can have a diametric notch or groove 213 in its bottom surface and along the vertical walls thereof. The notch will promote even dispersal of the adhesive by providing a guide path which fills with adhesive during the pitch blocking operation. When the adhesive in the notch 213 hardens, it will act as a key to prevent relative rotation between the pitch block and the precursor during a cutting operation in which the cutting tool engages the rotating precursor and tends to inhibit rotation of the precursor. Alternatively, or in addition, a circular or annular groove can be provided around the bottom periphery of the recess in the pitch block.

During the first pitch blocking operation, a pitch block such as that illustrated in FIG. 8 is clamped in the jaws of the bottom chuck of the machine. Such an arrangement is illustrated in partial cross sectional view in FIG. 9.

Referring now to FIG. 9, the cylindrical portion 206 of the pitch block is clamped in the jaws 20 of the bottom chuck 12, with the flanged end 208 of the pitch block resting on upper surface of the jaws. Each of the jaws 20 has a cutout in the lower portion thereof defining a shoulder 214. A floating registration member comprising an enlongated rod 216 with a disc 218 integrally attached to one and thereof is disposed in the central bore of the bottom chuck 12, with the disc 218 in the space formed by the lower cutouts in the jaws 20. The disc 218 is upwardly biased into engagement with the shoulders 214 of the jaws by means of a spring 220. The length of the elongated rod 216 is such that its top surface is substantially flush with, or slightly below, the bottom surface of the recess 210 in the pitch block 32 when the pitch block is clamped in the jaws of the bottom chuck 12 and the disc 218 is biased into engagement with the shoulders 214 of the jaws. The elongated rod 216 has an outside diameter which is slightly less than the diameter of the central bore 212 at the recessed end of the pitch block 32. For example, the elongated rod 216 can have an outside diameter of 0.125 inch and the central bore 212 can have a diameter of 0.127 inch at the recessed end of the pitch block 32.

During the first pitch blocking operation, the pitch block 32 is clamped in the jaws of the bottom chuck 12, adhesive is deposited into its recess 210, and the lens precursor 34, which is clamped in the top chuck 16, is lowered into the recess to be adhered to the pitch block. The elongated rod 216 of the plug member prevents any substantial amount of the liquid adhesive from running down into the central bore 212 of the pitch block.

After the lens precursor is mounted on the pitch block, the pitch block can be inserted into a chuck on a lathe and a concave base curve, for example, can be cut into the surface of the precursor opposite the surface which is adhered to the pitch block. The precursor is then ready for the second mounting operation, in which a pitch block having a curved surface, such as that disclosed in commonly assigned application Ser. No. 928,978, is adhered to the cut surface of the precursor. In this second mounting operation, the first pitch block with the cut lens precursor mounted thereto can be clamped in the bottom chuck 12 of the machine and the second pitch block, having the curved surface, can be clamped in the top chuck 16, as illustrated in FIG. 1.

After the first pitch block is removed from the lower chuck in the first mounting operation, some of the adhesive may still be in a molten state and seep down into the bore 212 in the pitch block and harden there, or it may expand into the bore during hardening. During the second mounting operation, the spring 220 will be compressed to enable the plug member 216, 218, to move in a downward direction to accommodate the adhesive in the central bore. Thus, the biased plug member inhibits a substantial amount of adhesive from entering the bore hole during the first mounting operation but does not prevent proper alignment of the pitch block in the bottom chuck during the second mounting operation when some hardened adhesive is present in the bore.

During the first mounting operation, in which a lens precursor having two flat sides is mounted on a pitch block such as that illustrated in FIG. 8, the lens precursor is supported by the top chuck 16. The precursor can be directly clamped in the jaws of the chuck. Alternatively, an adapter can be used to eliminate the need to close and open the jaws of the top chuck during each mounting operation. One such adapter suitable for this purpose is illustrated in FIG. 10.

Referring now to FIG. 10, the precursor mounting adapter 222 is substantially cylindrical in shape and includes a narrow diameter portion 224 adapted to be clamped by the jaws 20 of the top chuck 16. A circular recess 226 is provided in the lower end of the adapter 222. An axial bore 228 is integral with the recess 226. A radial bore 230 provides fluid communication between the axial bore 228 and a port on the circumferential surface of the adapter. A vacuum line 232 can connect the port on the adapter to a vacuum pump 233 by any suitable connection means (not shown). A suitable conventional regulator 234 can be provided in the vacuum line 232 and can be adjustable for providing a variable vacuum level to the adapter 222.

In operation, the adapter 222 is clamped in the top chuck 16, as shown in FIG. 10, prior to the initiation of the first mounting operation. When a lens precursor is inserted into the recess 226, the vacuum in the adapter will provide sufficient force to hold the precursor in the adapter, against the force of gravity. If necessary, a plug or other suitable blocking device can be inserted in the top end of the bore 228 to render the vacuum effective to hold the precursor in the adapter.

Since the vacuum in the adapter 222 automatically holds a precursor inserted into its recess 226, it is not necessary for the operator to close and open the jaws 20 of the top chuck 16 during each cycle of the first mounting operation. It is only necessary to insert the precursor in the recess of the adapter. The adjustable regulator 234 permits the vacuum to be increased when an irregularly shaped lens precursor, e.g., a precursor having a convex outer surface, is to be inserted in the adapter 222.

A second embodiment of an adapter suitable for use during the first mounting operation is illustrated in FIG. 11. In the adapter of this embodiment, the vacuum source is not used to hold the lens precursor in place in the recess of the adapter. Rather, a resilient O-ring 236, made from rubber, for example, is provided in a circular groove around the periphery of the recess 226. The O-ring 236 has an inside diameter smaller than the diameter of the recess 226 and provides a radially compressing force on a lens precursor inserted into the recess, to thereby hold the precursor in the adapter 222.

One type of device suitable for removing a lens precursor from a first operation pitch block, after a curve has been cut in the precursor, is illustrated in FIG. 12. The removal device includes a support stripper block 240 for supporting a first operation pitch block 32 and a lens precursor 34 mounted thereto. The support stripper block 240 includes a rounded support surface 242 upon which the narrow circumferential surface of the pitch block 32 and the circumferential surface of the lens precursor 34 rest. The support surface 242 is provided with a rounded groove 246 into which the flanged end 208 of the pitch block 32 is inserted.

In the example illustrated in FIG. 12, the planar surface of the lens precursor 34 is adhered to the first operation pitch block 32, and the opposite surface of the lens precursor, in which a concave base curve has been cut, is adhered to the spherical surface of a second operation pitch block 36. To accommodate this combination of a lens precursor adhered to two pitch blocks, the support surface 242 is provided with a second rounded groove 248 to accommodate a flange 250 on the second operation pitch block 36. The second groove 248 is preferably wider than the flange 250, to provide for variation in the thickness of the lens precursor 34.

The support stripper block 240 includes an upstanding portion 252 located adjacent the end of the first operation pitch block 36 opposite that end to which the lens precursor 34 is mounted. The upstanding portion 252 includes a bore 254 which is co-axial with the central bore 212 in the first operation pitch block 32.

To remove the lens precursor 34 from the first operation pitch block 36, and thereby enable a convex power curve to be cut into the lens precursor 34, a tool such as an elongated rod 256 is disposed in the bore 254 of the support block 240 and the central bore 212 of the pitch block 32 and engages the surface of the lens precursor 34 adhered to the pitch block. A predetermined controlled force is applied to the end of the tool 256 remote from the pitch block, by a fluidic device, such as a cylinder and piston arrangement 257, for example. A rubber tip 258 on one end of the rod 256 and a compression spring 260 at the other end thereof can be included to control the force applied by the fluidic device 257 and inhibit any sudden impact which may tend to weaken or destroy the bond between the lens precursor 34 and the second operation pitch block 36.

The force translated by the tool brings the flanged end 208 of the pitch block into engagement with the vertical surface 262 of the groove 246. Once the flanged end 208 abuts this surface of the groove 246, its rightward movement, as viewed in FIG. 12, will be halted but the lens precursor 34 will continue to move to the right under the force transmitted by the tool 256. The precursor 34 will thereby be separated from the first operation pitch block 32 and remain attached only to the second operation pitch block 36. Any adhesive remaining on the planar surface of the lens precursor 34 can then be removed by a chemical solvent, for example, and the combination of the lens precursor 34 and the second operation pitch block 36 can then be inserted into a lathe for the second cutting operation.

It will be appreciated that although the above described example includes a lens precursor mounted on two pitch blocks on opposites sides thereof, the precursor removal device illustrated in FIG. 12 can also be used to remove a lens precursor 34 from a pitch block 32 prior to the time that the precursor is mounted on a second operation pitch block 36.

In addition, the removal operation can be carried out manually without the use of the support stripper block 240. For example, an operator can grasp the pitch block 32 and lens precursor 34 between his index and middle fingers, and apply pressure to the remote end of the elongated rod 256 with his thumb, in much the same manner as a hypodermic needle is operated. The applied force is controlled and is generally sufficient to break the bond between the pitch block and the precursor.

SUMMARY OF THE ADVANTAGES OF THE INVENTION

From the foregoing, it will be appreciated that the present invention achieves a number of significant advantages in the mounting of a work piece to a support block. The semi-automatic operation of the mounting machine eliminates the need for highly skilled operators. In addition, the precise alignment of the chucks of the machine provides for controlled repeatability in obtaining concentricity of a work piece and a support block within a very small tolerance range. The optional relative rotation between the work piece and the support block while they are brought into engagement with one another serves to spread the adhesive between their interfacing surfaces more evenly.

The heating of the adhesive and a second operation pitch block provides optimum flow characteristics which enable a precursor and the pitch block to contact one another at their centers, thereby permitting the position of the precursor with respect to a cutting tool to be more precisely defined.

The preferred embodiment of the control circuit, in addition to providing automatic operation of the machine, provides for safety in the operation of the machine since it requires a signal indicating that the hands of operator are in a position remote from the moving parts of the machine, to thereby avoid the occurrence of accidents wherein the operator's hands may be pinched or otherwise injured by the moving machine parts.

The use of an adapter to support the lens precursor during the first mounting operation further increases the rate of production, since it eliminates the need for opening and closing the jaws of the top chuck of the machine during each cycle of operation.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of the equivalency of the claims are therefore intended to be embraced therein.

What is claimed is:

1. Apparatus for aligning and mounting a lens precursor on a support block for subsequent use in a machine for fabricating optical lenses, comprising:

first means for supporting one of a lens precursor and a support block in a predetermined fixed position relative to an alignment axis;

second means for supporting the other of a lens precursor and a support block in a predetermined radially fixed position relative to the alignment axis and translatable relative to said first supporting means along the alignment axis between a first position in which a lens precursor and a support block supported in said first and second supporting means are spaced from one another and a second position in which the lens precursor and support block engage one another;

means for depositing a predetermined quantity of adhesive on the lens precursor or support block supported in said first supporting means while said second supporting means is in said first portion, said depositing means being movable between a first position proximate said first supporting means to deposit adhesive on a lens precursor or support block supported in said first supporting means and a second position in which it is spaced from said first and second supporting means;

means for automatically moving said depositing means from said second position to said first position in response to a signal from an operator indicating that a lens precursor and a support block are supported in said first and second supporting means and for returning said depositing means to said second position after a predetermined amount of adhesive has been deposited; and means for automatically translating said second supporting means from said first position to said second position in response to movement of said deposition means from said first position to said second position, wherein said moving means comprises a fluid actuated cylinder, and wherein said second supporting means comprises a vertically translatable support member operatively connected to said cylinder, a chuck mounted on said support member, and means for providing limited vertical movement between said chuck and said support member.

2. The apparatus of claim 1 wherein said means for providing limited vertical movement includes shoulder screws attached to said chuck and vertically slidable within said support member, and compression springs disposed between the shoulders of said screws and said support member to control the force translated to said chuck when said support member is moved upwardly by said cylinder.

* * * * *